United States Patent Office 3,375,087
Patented Mar. 26, 1968

3,375,087
PROCESS FOR PREPARING HYDRAZINE MONOBORANE
Frank C. Gunderloy, Jr., Menlo Park, N.J., assignor to Esso Research and Engineering Company, a corporation of Delaware
No Drawing. Continuation-in-part of application Ser. No. 820,823, June 15, 1959. This application Nov. 25, 1959, Ser. No. 855,471
4 Claims. (Cl. 23—358)

This is a continuation-in-part of U.S. patent application Ser. No. 820,823, filed June 15, 1959, now abandoned.

The present invention relates to a novel hydrazine compound and the preparation thereof. Specifically, it concerns making hydrazine borane which is useful as a fuel, especially in rockets which employ monopropellant systems. In particular, it relates to a novel method for preparing hydrazine monoborane by reacting ionic hydrazine compounds with borohydrides, preferably in the presence of cyclic ether diluents.

A great deal of research work has been undertaken in recent years to find suitable monopropellants that are capable of propelling rocket devices. Solid monopropellants that are stable at ambient temperatures are highly desirable as motors in "pure" rockets, i.e. thrust producers which do not use the surrounding atmosphere, because they can be stored for long periods of time and are ready for immediate use. The term "monopropellant" as used herein means a substance which does not need any other substance to bring about the release of its thermochemical energy.

An object of this invention is to provide a process for the preparation of stable hydrazine monoborane. Another object is to provide a simple method for isolating and recovering hydrazine monoborane from the other substances in the reaction mixture.

It has now been discovered that hydrazine monoborane can be satisfactorily prepared by reacting ionic hydrazine compounds with borohydrides in the absence of diethyl ether. The hydrazine monoborane prepared in accordance with the process to be described hereinafter is a stable high energy chemical that can be combusted in the absence of other substances, such as oxygen.

Preferably, the process is carried out by contacting an ionic inorganic or organic hydrazine compound with a stable borohydride under reaction conditions, that is to say, in the liquid phase between about —80° C. and the decomposition temperature of the reaction product. The hydrazine reactant may be either a nonmetal-containing substance or a metal-containing substance. In the latter compounds the hydrazine is coordinated with one or more positive ions. The nonmetal hydrazine reactant is a compound which contains a monoprotic hydrazinium ion ($N_2H_5^+$) whose primary valence is ionically bonded to a negative ion or anion. Nonmetal hydrazine reactants coming within the purview of this invention have the formula:

$$S(N_2H_5^+)_m$$

wherein "S" is an organic or inorganic anion; "H" and "N" are hydrogen and nitrogen, respectively and "$m$" is an integer of 1 to 3 which is equal to the valence of anion "S." The anion "S" is a nonmetallic ion, such as acetate, formate, carbamate, phosphite, phosphate, azide, nitrite, nitrate, oxalate, glutarate, sulfate, chlorate, perchlorate, butyrate, laurate, cyanate, thiocyanate, chloride, bromide, etc. Examples of nonmetal hydrazine compounds coming within the scope of the above formula are: hydrazine hydrochloride, hydrazine hydrobromide, hydrazine hemisulfate ($NH_2NH_2 \cdot \frac{1}{2}H_2SO_4$), hydrazine acetate, hydrazine formate, hydrazine monophosphate, hydrazine nitrate, hydrazine monofluoroborate, hydrazine perchlorate, hydrazine chlorate and hydrazine cyanate.

If the reactant contains a metal, care should be taken to select a substance that does not interfere with the reaction of the hydrazine compound with the borohydrides. Among the metal compounds which may be used are metal halide hydrazinates such as magnesium dichloride tetrahydrazinate, calcium dichloride tetrahydrazinate, zinc dichloride dihydrazinate, chromium diiodide hexahydrazinate, silver bromide hydrazinate, nickel dibromide trihydrazinate and copper dicyanide hydrazinate. The useful metals are those in Groups I–B, II–A, II–B, IV–B, VI–B, VII–B and VIII of the Periodic Chart of Elements (Langes Handbook of Chemistry, 8th edition, pp. 56–57). Metals such as nickel, silver, strontium, tin, zinc, mercury, manganese, chromium, copper, cobalt, calcium, cadmium, barium and especially magnesium are suitable. The preferred metals are in Groups I–B, II–A and II–B. The metal reactants may be generically described by the following general formula:

$$(MX_a) \cdot (H_2NNH_2)_b$$

wherein "M" is a metal; "X" is a halogen or pseudohalogen, e.g. cyano; "H" and "N" are hydrogen and nitrogen, respectively; "$a$" is an integer of 1 to 3 and is equal to the valence of "M"; and "$b$" is an integer of 1 to 6, although it is generally 1 to 4, and is equal to the co-ordination number of the metal "M." Thus, any ionic hydrazine ($H_2N \cdot NH_2$) salt whether metal or nonmetal, organic or inorganic may be used in this reaction.

There is nothing critical about the borohydride reactant, the only requirement being that it be sufficiently stable to use it in the process. Among the borohydrides which can be used in the practice of the invention are the inorganic metal salts, e.g. aluminum, alkaline earth metals and especially alkali metals, and the nitrogen salts, particularly the quaternary ammonium tetraalkyl salts. Examples of suitable stable borohydride compounds are sodium borohydride, potassium borohydride, calcium borohydride, magnesium borohydride, tetramethylammonium borohydride, tetraethylammonium borohydride, etc. The nitrogen salts are expensive and sometimes unstable, particularly the ammonium salt. The preferred salts are the alkali metal borohydrides because they are stable and readily available.

The preferred reactants are sodium borohydride and hydrazine hemisulfate ($N_2H_4 \cdot \frac{1}{2}H_2SO_4$) or hydrazine hydrochloride. If desired, the monoborane may be prepared with metal halide hydrazinates that are formed in situ. For example, a metal halide hydrate may be reacted with hydrazine in the presence of a borohydride compound to yield hydrazine borane. The metal in the halide compound may be selected from any of those named above, and especially magnesium.

Since the reactants are generally solids, it is desirable to employ an inert liquid diluent to facilitate handling the reactants and afford better contact in the reaction zone. It is sometimes advantageous to admix one or both reactants with diluent before introducing them to the reaction zone where they are intimately contacted by means of an efficient stirring device. The diluent should not contain any functional groups which react either with the reactants or the desired product, except of course where it promotes the reaction in some manner. While carbonyl compounds, i.e. aldehydes and ketones, and alcohols, are usually not satisfactory diluents, certain ethers, acids, hydrocarbons, anhydrides, esters, amides, acetals, nitriles, halides and even hydrazine can be employed. The preferred diluents are 5 or 6 member heterocyclic ethers, such as tetrahydrofuran and dioxan, since they assist the reaction by serving as a solvent for the hydrazine product. The cyclic ether solvents also facilitate the separation of the product from the reaction mixture because the nongaseous by-products are often insoluble in these ethers. Thus, by adding them to the reactants or the products, separation can be accomplished by a simple filtration. Moreover, in a continuous process, the cyclic ether can be continuously removed from the reaction zone, flashed or distilled from the product and recycled to the reactor. Other common inert diluents, for example $C_5$ to $C_{10}$ hydrocarbons such as benzene, heptane and hexane may also be utilized, but they do not have the advantages associated with the cyclic ethers. Where the diluent is not also a selective solvent for the product, separation may be achieved by distilling or filtering off the diluent and recovering the hydrazine borane by sublimation. Any other separation techniques known in the art may also be employed, such as selective extraction and classification based on density differences among the solids present.

The reaction conditions are not critical, and therefore, the temperatures and pressures employed are governed by the economics of the particular process. Ambient temperatures and atmospheric pressure are suitable conditions for carrying out the reaction. However, temperatures in the range of 0 to 30 or 45° C. and pressures between about 10 mm. and 1 atmosphere or slightly higher have been found to be quite satisfactory. Care must be taken at the higher temperatures, e.g. above 55° C., to avoid degradation of the desired reaction product. Thus while higher temperatures reduce reaction time, they are usually accompanied by other things which may be more injurious than the benefits derived by their use. At room temperature or lower the reaction is generally carried out for a period ranging up to 10 days, e.g. several hours to 5 days. The reaction commences almost immediately upon contacting the reactants as is evidenced by the evolution of hydrogen from the reaction mixture. The hydrogen may be recovered and used in other chemical processes such as the hydrogenation of aldehydes to form alcohols.

The atmosphere in the reaction zone must be inert in order to avoid product degradation. Inert gases, such as nitrogen, helium and argon, may be employed to flush out the reactor at the beginning of the run. Thereafter these gases may be circulated through the reactor to remove any hydrogen formed therein during the reaction.

It is important to avoid contamination of the components in reaction mixture with diethyl ether since this substance has a deleterious effect on hydrazine monoborane. Moreover, this ether should not be used to purify the product because it will degrade it. It is usually advisable to carry out the process in the absence of acyclic ethers.

The hydrazine monoborane prepared in accordance with the process described herein is highly stable at room temperature (25° C.) and is neither impact nor friction sensitive. It has the empirical formula $B_1N_2H_7$ and is believed to have the following structure:

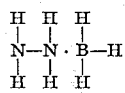

in which there are coordinate bonds between the nitrogen and boron atoms. The product is crystalline when isolated from the aforementioned ethers and melts with decomposition at 55° C. It has a specific impulse of 256 sec.$^{-1}$ and when admixed with other fuels, such as boron or aluminum, higher specific impulses are obtained, e.g. an impulse of 292 sec.$^{-1}$ when 1 mole of borane is mixed with 1 mole of boron.

The hydrazine monoborane prepared in accordance with the present invention can be compounded with conventional materials used in solid rocket propellant systems, such as binders or adhesive substances. Because this monopropellant possesses an unusually low flame temperature, 1500 to 2000° K, it is especially suited for use in end burning rockets. End burning grains allow a more efficient use of the rocket case's volume and impose fewer mechanical (structural) limitations on the propellant. It is also useful as a coolant in rocket propellant mixtures which normally burn at high temperatures. If desired, an oxidizing agent, such as fluorine, can be included in the propellant mixture to change the combustion characteristics of the borane. Hydrazine monoborane is useful as a reducing agent in chemical reactions, e.g. reducing acetone to make isopropanol and it can be pyrolyzed to make hydrogen and boron nitride. Boron nitride is used in the manufacture of certain ceramics.

*Example 1*

Hydrazine hydrochloride (0.68 gm. or 0.01 mole) is contacted with 0.38 gm. (0.01 mole) of sodium borohydride in 50 ml. of dry benzene or hexane at room temperature. The reaction mixture is stirred and it is noted that hydrogen is evolved and the solids in the reaction vessel are converted to a gummy mass. When the hydrogen evolution ceases (6 days), the clear hydrocarbon liquid is decanted and the solid residue is extracted with tetrahydrofuran. Upon evaporation of the tetrahydrofuran under nitrogen, yields of 0.15 gm. (with hexane) to 0.35 gm. (with benzene) of crude hydrazine borane are recovered. This is equal to 33 and 76% yields, respectively. When the crude products are sublimed under vacuum at 40 to 45° C. and 0.02 ml. of mercury, they yield hydrazine borane which is 95% pure as determined by nitrogen analysis. Where benzene is the diluent, additional product may be recovered by evaporating the decanted liquid benzene.

*Example 2*

Magnesium dichloride tetrahydrazinate (1.8 gm. or 0.008 mole) is contacted with 0.6 gm. (0.016 mole) of sodium borohydride in 50 ml. of tetrahydrofuran (THF) at room temperature, and the resulting mixture is continuously stirred until the evolution of gas ceases (4 days). The solid residue is removed by filtration, the tetrahydrofuran is evaporated and a yield of 0.6 gm. of crude hydrazine borane is recovered. The solid product is admixed with 50 ml. of THF and permitted to react further at 45 to 50° C. This second reaction resulted in an additional 0.1 gm. of hydrazine borane after filtration and evaporation of the solvent. The yield is essentially quantitative and the product recovered is 92% pure as determined by nitrogen analysis (56% nitrogen found as compared with the theoretical nitrogen content which is 61%) without further purification. A portion of the product is sublimed at 40° to 45° C. and 0.02 mm. of mercury and a 98% pure product as determined by nitrogen analysis is recovered.

*Example 3*

Magnesium dichloride hexahydrate (3.2 gm. or 0.016 mole) is admixed with 1.2 gm. (0.032 mole) of sodium borohydride and 30 cc. of 95% hydrazine at 0° C. The mixture is stirred for several hours and the excess hydrazine is evaporated. The solid residue evolves hydrogen slowly for a period of two days, after which time the solids are extracted with THF. The extract is evaporated and 0.5 gm. of hydrazine borane (34% yield) is recovered. When the product is recrystallized from dioxan and tetrahydrofuran, it is 98% pure as determined by nitrogen analysis.

This example illustrates how the hydrazine reactant can be prepared in situ. It is believed that the hydrazine reacts with the magnesium chloride hexahydrate to form magnesium chloride tetrahydrazinate which in turn reacts with the sodium borohydride to form the borane.

*Example 4*

Hydrazine hydrochloride (0.68 gm. or 0.01 mole) and 0.38 gm. (0.01 mole) of sodium borohydride are stirred together in 50 ml. of dioxan at room temperature until hydrogen evolution ceases (2 days). The solids are filtered off and the dioxan solution is evaporated to yield a crude hydrazine borane which is 87% pure. The yield is essentially quantitative.

*Example 5*

Hydrazine hydrochloride (13.6 gm. or 0.2 mole) and 7.6 gm. (0.2 mole) of sodium borohydride are stirred together in 250 cc. of THF at 0° C. until hydrogen evolution ceases (3 days). The solids are removed by filtration and the THF solution is evaporated. A 67% yield of hydrazine monoborane (6.1 gm.) which is essentially pure is recovered. The product which has a melting point of 55° C. (dec.) has the following characterizations:

|  | Found | | Calculated |
|---|---|---|---|
|  | 1 | 2 |  |
| Boron, percent | 23.73 | 23.62 | 23.58 |
| Nitrogen, percent | 61.31 | 61.22 | 61.05 |
| Hydrogen, percent | 15.01 | 15.71 | 15.37 |
| Molecular Wt | 45.2 | | 45.9 |

*Example 6*

Example 5 is repeated with 0.1 mole of aluminum borohydride, made in situ from aluminum chloride and sodium borohydride, and 0.3 mole of hydrazine hydrochloride.

*Example 7*

Hydrazine monoborane is made by reacting 0.1 mole of hydrazine hydrochloride and 0.1 mole of potassium borohydride in 50 cc. of THF under nitrogen for 4 days at room temperature. The reaction mixture is filtered and the filtrate is evaporated to recover a 78% yield of monoborane.

It is not intended to restrict the present invention to the foregoing embodiment, but rather it should only be limited by the appended claims in which it is intended to claim all the novelty inherent in the invention.

What is claimed is:

1. Process for preparing hydrazine monoborane having the empirical formula $B_1N_2H_7$ which comprises reacting a borohydride salt selected from the group consisting of alkali metal, alkaline earth metal, aluminum, and quaternary ammonium borohydride salts with an ionic hydrazine salt containing the monoprotic hydrazinium ion ($N_2H_5^+$) in the presence of an inert liquid diluent with evolution of hydrogen to form the hydrazine monoborane, said borohydride salt and said hydrazine salt being mixed as solids in the diluent, forming in the diluent a solid by-product salt from the cation of the borohydride salt and the anion of the hydrazine salt, separating the hydrazine monoborane product in solution from the unreacted salt and by-product salt solids, and recovering the hydrazine monoborane from solution by separation of solvent in the solution.

2. The process according to claim 1 in which the inert liquid diluent is a cyclic ether that dissolves the hydrazine monoborane.

3. Process according to claim 1 in which the inert liquid diluent is a hydrocarbon liquid and in which a cyclic ether is used as a selective solvent for extracting the hydrazine monoborane.

4. The process as defined in claim 1 in which the ionic hydrazine salt is magnesium dichloride tetrahydrazinate.

References Cited

UNITED STATES PATENTS 3,323,878    6/1967    Gunderloy _____ 23—358

OTHER REFERENCES

Emaleus et al.: "J. Chem. Soc.," 840–1 (1951) Mar., abstracted in NSA 5, page 734, No. 4680 (1951).

Schlesinger et al.: "J. Am. Chem. Soc.," 75, pages 186–188, Jan. 5, 1953.

Schechter et al.: "Boron Hydrides and Related Compounds," 2nd edition, pages 6, 13, 44, 49, 50, 69, 70, 78, May 1954, declassified Jan. 6, 1958.

Steindler et al.: "J.A.C.S.," vol. 75, page 756, Jan. 1, 1953.

MILTON WEISSMAN, *Primary Examiner.*

WILLIAM WILES, CARL D. QUARFORTH, ROGER L. CAMPBELL, *Examiners.*

R. D. MORRIS, *Assistant Examiner.*